United States Patent
Finsterbusch et al.

(10) Patent No.: US 10,763,549 B2
(45) Date of Patent: Sep. 1, 2020

(54) METHOD FOR PRODUCING ELECTROCHEMICAL CELLS OF A SOLID-STATE BATTERY

(71) Applicant: FORSCHUNGSZENTRUM JUELICH GMBH, Juelich (DE)

(72) Inventors: Martin Finsterbusch, Juelich (DE); Chih-Long Tsai, Juelich (DE); Sven Uhlenbruck, Pulheim (DE); Hans Peter Buchkremer, Heinsberg-Schafhausen (DE)

(73) Assignee: FORSCHUNGZENTRUM JUELICH GMBH, Juelich (DE)

( * ) Notice: Subject to any disclaimer, the term of this patent is extended or adjusted under 35 U.S.C. 154(b) by 0 days.

(21) Appl. No.: 14/917,732

(22) PCT Filed: Sep. 5, 2014

(86) PCT No.: PCT/DE2014/000460
§ 371 (c)(1),
(2) Date: Mar. 9, 2016

(87) PCT Pub. No.: WO2015/043564
PCT Pub. Date: Apr. 2, 2015

(65) Prior Publication Data
US 2017/0263980 A1    Sep. 14, 2017

(30) Foreign Application Priority Data

Sep. 27, 2013  (DE) .................. 10 2013 016 131
Oct. 22, 2013  (DE) .................. 10 2013 017 594

(51) Int. Cl.
*H01M 10/0585* (2010.01)
*H01M 4/1391* (2010.01)
(Continued)

(52) U.S. Cl.
CPC ....... *H01M 10/0585* (2013.01); *H01M 4/139* (2013.01); *H01M 4/1391* (2013.01);
(Continued)

(58) Field of Classification Search
None
See application file for complete search history.

(56) References Cited

U.S. PATENT DOCUMENTS 3,660,163 A    5/1972  Moser
4,072,803 A *  2/1978  Schneider ............. H01M 6/182
                                            29/623.2
(Continued)

FOREIGN PATENT DOCUMENTS

CH       638 343       9/1983
DE       198 32 718    1/2000
(Continued)

*Primary Examiner* — Carmen V Lyles-Irving
(74) *Attorney, Agent, or Firm* — Norris McLaughlin, P.A.

(57) ABSTRACT

A method for producing at least one electrochemical cell of a solid-state battery, comprising a mixed-conducting anode, a mixed-conducting cathode, and an interposed electrolyte, is characterized in that a mixed-conducting anode and a mixed-conducting cathode are initially produced or provided. The surface of at least one of the two electrodes is modified by way of an additional method step in such a way that the electronic conductivity perpendicular to the cell is reduced to less than $10^{-8}$ S/cm in a layer of the electrode near the surface. The anode and cathode are then assembled to form a solid-state battery in such a way that the surface-modified layer of at least one electrode is disposed as an electrolyte layer between the anode and cathode, and the mixed-conducting electrodes are thereby electronically separated.

11 Claims, 2 Drawing Sheets (51) Int. Cl.
*H01M 4/1393* (2010.01)
*H01M 10/052* (2010.01)
*H01M 10/0565* (2010.01)
*H01M 6/18* (2006.01)
*H01M 10/0562* (2010.01)
*H01M 4/36* (2006.01)
*H01M 4/139* (2010.01)
*H01M 4/38* (2006.01)
*H01M 4/485* (2010.01)
*H01M 4/587* (2010.01)
*H01M 4/1397* (2010.01)
*H01M 4/02* (2006.01)

(52) U.S. Cl.
CPC ......... *H01M 4/1393* (2013.01); *H01M 4/366* (2013.01); *H01M 4/386* (2013.01); *H01M 4/387* (2013.01); *H01M 4/485* (2013.01); *H01M 4/587* (2013.01); *H01M 6/188* (2013.01); *H01M 10/052* (2013.01); *H01M 10/0562* (2013.01); *H01M 10/0565* (2013.01); *H01M 4/1397* (2013.01); *H01M 2004/021* (2013.01); *H01M 2300/0068* (2013.01); *H01M 2300/0071* (2013.01)

(56) References Cited

U.S. PATENT DOCUMENTS

| | | | |
|---|---|---|---|
| 4,243,732 A | 1/1981 | Powers et al. | |
| 8,623,301 B1* | 1/2014 | Deininger | H01M 8/1253 423/21.1 |
| 8,906,556 B2 | 12/2014 | Hambitzer | |
| 2011/0206974 A1* | 8/2011 | Inoue | H01M 4/043 429/149 |
| 2012/0148731 A1* | 6/2012 | Chen | H01M 4/0416 427/77 |

FOREIGN PATENT DOCUMENTS

| | | |
|---|---|---|
| EP | 1 923 934 | 5/2008 |
| JP | S55104078 A | 8/1980 |
| JP | S58198865 A | 11/1983 |
| JP | S60189169 A | 9/1985 |
| JP | 2004206942 A | 7/2004 |
| WO | WO-2012/157119 | 11/2012 |

* cited by examiner

METHOD FOR PRODUCING ELECTROCHEMICAL CELLS OF A SOLID-STATE BATTERY

BACKGROUND OF THE INVENTION

The invention relates to the production of a solid-state battery, and more particularly to the joint between an anode and a cathode via a non-electron-conducting electrolyte layer.

Rechargeable lithium-ion batteries, hereafter also referred to as Li-ion batteries, have had widespread success in recent years. They can already be found in many mobile devices. In addition to hybrid and electric vehicles, their field of application also includes the potential storage of power from wind or solar energy plants. However, today's Li-ion batteries cannot yet satisfy some requirements, which is why many efforts are being undertaken to explore novel battery concepts.

Electrochemical storage devices that are based on the galvanic cell, which are colloquially also referred to as batteries, are particularly suitable for storing electrical energy. They are always composed of an anode, a cathode, and an electrolyte. Batteries can be intended for one-time use (primary battery) or be reusable (secondary battery, rechargeable battery).

There are a multitude of possible materials for the anode and the cathode that can be used for classification, the best-known arguably being zinc-carbon (Zn—C) batteries, alkali-manganese (alkaline) batteries, nickel-cadmium (Ni—Cd) batteries, nickel-metal hydride (Ni-MH) batteries, and lead (Pb) batteries.

In addition, the electrolyte may also be used for classification, for example liquid, gel or polymer electrolytes can be used in Li-ion batteries. Current standard battery types contain liquid or gel-like electrolytes almost exclusively.

These liquid or gel-like electrolytes can pose considerable safety risks. They can be strong acids or lyes, for example, or contain short-chain solvents, which are easily flammable. In the event of heating, for example as a result of a short circuit, electrolyte may leak and jeopardize the user or ignite the entire battery. In Li-ion batteries, for example, this is known as thermal runaway and has created considerable problems for the large-scale use of this battery type not only in cars, but also in aircraft.

The solid-state battery or solid-state electrolyte battery type represents a new kind of battery that is inherently free of the aforementioned safety risks and is therefore clearly superior to conventional types in this regard. Instead of a (gel) electrolyte that is normally liquid or stabilized by way of polymers, these use an ion conducting solid material. This may be either organic (polymers, and the like) or inorganic (ceramics, glasses, and the like). Crucial aspects for the functionality of an electrolyte are low electronic conductivity, with high ionic conductivity and (electro)chemical stability with respect to the anode and cathode materials.

Examples of inorganic solid-state ion conductors are, for example, yttria-stabilized zirconia and gadolinium-stabilized coria, which are able to conduct oxygen ions and can be used as an electrolyte for high-temperature metal-metal oxide batteries having a composition similar to a solid oxide fuel cell. Further examples are β-alumina, which is able to conduct sodium ions and is used in Na liquid metal batteries, and lithium phosphorus oxynitride (UPON), which is able to conduct lithium ions and is used in lithium thin film batteries. This series can be continued for a multitude of further ions of elements or compounds ($F^-$, $CO^{2-}$, and the like) which could be used for potential battery applications and is therefore not exhaustive, and does not represent an exclusion criterion. This is only intended to point out the basic properties of the electrolyte material.

In research, for example, an intrinsically safe lithium solid-state battery comprising Al and Cu contacts, a $LiFePO_4$ cathode, a $Li_7La_3Zr_2O_{12}$ electrolyte, and a Si anode is known. A thin film battery having a similar composition is also known and is already being commercialized, which is sold by Infinite Power Solutions under the trade name Thinergy®. High-temperature sodium batteries comprising the above-mentioned alumina solid electrolyte are already being sold by Fiamm Sonick for use in electric vehicles.

Typically, batteries in general comprise a single- or multi-phase mixture, as do the cathode and the anode in solid-state batteries, regardless of whether these are primary or secondary batteries. The phases are a first phase a, for example, comprising the active material for ion insertion or removal, a second phase b, comprising the material for ion conduction, and a further phase c, which comprises a material having electronic conductivity. Optionally, one or more functions may also be assumed by a material of another phase. The individual phases can be, but do not have to be, present in the same state and are hereafter referred to as mixed-conducting electrodes.

A conventional lithium-ion battery, for example, has a porous matrix made of carbon on the anode side, which is used both to insert the lithium ions and to transport the current. The cathode side has a porous matrix made of $LiFePO_4$ and carbon. Both matrices are saturated with a liquid electrolyte. As a result, a two-phase mixture (solid-liquid) is present on the anode side, and a three-phase mixture (solid-solid-liquid) is present on the cathode side.

These anodes and cathodes are separated by a respective electrolyte, which represents a layer that is not conducting to electrons, but has the highest possible ionic conductivity. In the case of the conventional Li-ion battery, this is achieved by an additional porous, not electron- or ion-conducting separator that is saturated with electrolyte and used, among other things, to spatially separate the liquid-saturated anode and cathode. This spatial separation should advantageously be kept as thin as possible, in order to minimize the overall internal resistance of the cell.

Without being limited to these, typical methods for producing or applying a solid-state electrolyte are the methods listed below:

producing thin layers by way of typical ceramic methods (such as screen printing, tape casting, ink jet printing), or by way of physical or chemical thin film methods (such as physical or chemical vapor deposition, sol gel methods (dip coating, spin coating, and the like)) or else by way of thermal spraying (vacuum or atmospheric plasma spraying, and the like). These methods are all based on the application of an additional electrolyte layer having the above-mentioned properties, low electronic conductivity and high ionic conductivity, which may pose greater demands on process control, material selection and quality of the anodes, cathodes and electrolyte and may increase the technical complexity, and thus the costs of the production process and of the end product.

Exemplary embodiments of such solid-state batteries or batteries comprising solid-state electrolytes are known from industry, but so far have rather been a niche segment due to complex production methods and consequently high costs (per unit of capacity). A commercial lithium-based solid-state thin film cell is marketed by Infinite Power Solutions, for example, under the name Thinergy® MEC200. Every component of the cell is produced by way of a complex vapor deposition method. It is only possible to implement thin electrodes in this way, which drastically impairs the overall capacity of the cell.

Another exemplary embodiment is the "Zebra" battery marketed by FIAMM, which is a Na ion technology-based liquid-solid-liquid battery as described above and operated at approximately 270° C.

It is the object of the invention to provide a novel method for producing a solid-state battery which provides for an ion-conducting, but electrically insulating, layer that is as thin as possible, as the electrolyte between an anode and a cathode of a battery cell, while being simple and/or inexpensive.

SUMMARY OF THE INVENTION

To the extent that the term solid-state battery is used in the following description of the invention, this shall cover both primary batteries and secondary batteries.

The basic idea of the invention is based on dispensing with the introduction or application of a separate electrolyte layer in the production of a solid-state battery, and instead directly using the ionically conducting phase present in the mixed-conducting electrodes to electronically separate the electrodes. For this purpose, a novel process step is proposed in the production of an anode and/or a cathode, in which the surface of at least one of the produced or provided mixed-conducting electrodes is modified to a certain depth in such a way that the electronic conductivity is considerably decreased, or completely reduced, in this modified region. The existing ionic conductivity in this surface region, however, should be impaired to the least extent possible. The region thus modified can thereafter advantageously assume the function of an electrolyte layer.

In an advantageous embodiment of the invention, it is provided that one respective surface of the two mixed-conducting electrodes, which is to say of both the anode and the cathode, is modified in this way, wherein the electrolyte layer is then formed when assembled, by the two modified regions together.

The typical mixed-conducting electrodes, which are designed to be both electron- and ion-conducting and can be produced or used within the scope of the present invention, generally comprise a single- or multi-phase mixture.

The purpose of the modification, according to the invention, of the surface of an electrode by way of an additional treatment is to alter a region of one electrode, or of both electrodes, near the surface in such a way that this region, or the regions, can assume the function of an electrolyte. The goal of the modification is thus to reduce the electronic conductivity in the surface region of a mixed-conducting electrode to such an extent that a functional battery results after the anode and cathode are joined, wherein the modified surface region of at least one of the two electrodes has good ion-conducting properties, but poor electron-conducting properties. The modified surface region according to the invention thus prevents direct electronic contact between the electrodes, and consequently short circuits.

Within the scope of this invention, the term "poor electron-conducting" shall be understood to mean an electrical conductivity of less than $1 \times 10^{-8}$ S/cm. This value is at the upper limit for systematically preventing an electronic short circuit between the anode and the cathode. However, an electronic conductivity of less than $1 \times 10^{-10}$ S/cm is advantageous. Since the electrolyte layer should be designed as thin as possible, however, even lower electronic conductivities down into the range around $1 \times 10^{-12}$ S/cm, or even lower, are particularly desirable for this modified region.

In addition to being suitable for reducing the electronic conductivity in the surface region of an electrode, the additional treatment method should advantageously also have characteristics such as will not impair the ionic conductivity of the modified surface region of the previously mixed-conducting electrode, which would be disadvantageous.

This means that the modified surface region, after such an additional treatment, should have the ionic conductivity that is generally necessary for an electrolyte, which in the case of a Li-ion battery is at least $10^{-6}$ S/cm, however advantageously at least $10^{-4}$ S/cm, and particularly advantageously even more than $10^{-2}$ S/cm.

The respective ionic conductivity of the modified surface region that is required for a solid-state battery also depends on the layer thickness of the surface region, since a particularly thin layer thickness may again partially compensate for ionic conductivity that is not so good.

Within the scope of the invention, without being exhaustive, the following shall be mentioned in particular as suitable additional treatment methods that are able to reduce the electronic conductivity in the surface region of a mixed-conducting electrode, without adversely impairing the ionic conductivity:

chemical reactions with a liquid reagent (such as etching by way of an acid or a lye, or else doping);

chemical reactions with a gaseous reagent or a plasma (such as heating of the surface in a gas, gas etching or else a plasma treatment);

chemical reactions with a solid reagent (such as with a joining agent that chemically alters the contact surface in the above-mentioned manner when the cathode and anode are joined); and physical phase changes (such as the heating of a surface in a furnace with or without a protective atmosphere, heating by way of laser treatment or by way of a plasma).

Suitable examples for an additional treatment method by way of a chemical reaction which should be mentioned are heating in oxygen, air or ozone, ozone etching by way of a plasma, and treating the surface with an oxidizing acid, which can also be used to modify carbon, for example.

Suitable examples of a phase change is a laser treatment of the surface in an inert atmosphere, such as He or Ar, or else the heating of the surface by way of a He or Ar plasma.

The depth to which the electronic conductivity of the electrode must be eliminated by the additional treatment depends on various parameters. The most important is the electronic conductivity of the electrolyte layer itself that is produced as a result of the modification of the electrodes. For functionality as a solid-state battery, a sufficiently low self-discharge should be ensured. Desirable values for the electronic conductivity of the electrolyte or of the modified surface region are a maximum of $1 \times 10^{-8}$ S/cm, wherein a value of around $1 \times 10^{-10}$ S/cm is better, and a value of around or less than $1 \times 10^{-12}$ S/cm is particularly advantageous. The more the electronic conductivity can be reduced in the modified region of the mixed conductor as a result of the additional treatment, the less layer thickness to which the treatment must extend can be selected.

The relationship between the nominal voltage U of a solid-state battery, the maximum self-discharge current I, the electrode surface A, the layer thickness of the electrolyte d, which within the scope of the invention either corresponds to the layer thickness of the modified region of one electrode or to the cumulative layer thicknesses of the modified regions of both electrodes, provided they represent the electrolyte together, and the electronic conductivity G is defined by the following formulas.

$$I = \frac{U}{R} \text{ and } R = \frac{d}{\sigma A}$$

At a predefined nominal voltage U of a solid-state battery, electrode surface A and predefined maximum self-discharge current I, the depth d of the region to be treated is found as a function of the electronic conductivity σ achieved by the treatment.

$$d = \frac{AU}{I}\sigma$$

Depending on the electronic conductivity that is achieved, the sum of the required layer thicknesses for the modified surface region therefore typically ranges from 1 nm to several tens of μm.

Furthermore, it is also useful to select the required depth of the treatment in relation to the particle size and phase distribution of the mixed-conducting electrode. Common ceramic powders that are suitable for producing a mixed-conducting electrode have a particle size range between 1 nm and 1 mm. The subrange from 10 nm to 100 μm is useful, or more relevant, for the majority of conventional applications. A particularly advantageous range could be around a 1 μm particle size; however, this may vary depending on the specific requirements of an application.

In conventional Li-ion batteries, it was found that the power density is inversely proportional to the particle size of the anode or cathode active material, which is to say smaller particles result in greater or higher discharge currents (low capacity), while the energy density is proportional to the particle size of the anode or cathode active material, which is to say larger particles result in lower discharge currents (high capacity).

The surface of the electrode thus treated is treated by the method according to the invention in such a way that the electronic conductivity on the surface of the electrode is eliminated or considerably reduced, but the ionic conductivity is not. As a result of this treatment, this treated surface region can now perform the function of an electrolyte. Optionally, but not necessarily, the active material may also be modified in the same step, or a second step.

Modifying the active material as well may become necessary, for example, when the active material itself also has electrical conductivity that cannot be disregarded. The electrical conductivity of the cathode material $LiCoO_2$ is relatively good, for example, while the electrical conductivity of $FePO_4$ as a cathode material is very low.

In a special embodiment of the invention, the two mixed-conducting electrodes, which is to say both the anode and the cathode, are subjected to an additional treatment, so that the two electrodes subsequently comprise a surface region having considerably reduced electronic conductivity.

In this case, it is possible to employ identical or different treatment methods, depending on the electrode material. Identical treatment methods would result in further advantageous process-related savings, since only a single additional method must be employed for both the anodes and the cathodes.

In the case where both the anode and the cathode are subjected to an additional treatment, it follows that the above-mentioned estimates with respect to the required layer thickness of the modified regions then forming the electrolyte layer refer to the sum of the individual modified layer thicknesses of the anode and the cathode.

In one embodiment of the invention, the surfaces of both the anode and of the cathode are modified using an identical method, and the ascertained required layer thickness is advantageously divided in half between the anode and cathode. This would have the further advantage that the process settings could be maintained virtually unchanged, regardless of whether the surface of an anode or of a cathode is to be modified.

Thereafter, the anode and the cathode, at least one of them having undergone one of the aforementioned surface treatments, are brought together and suitably joined. In doing so, the functionality is to be preserved, so that it is possible for the ions to migrate through this interface in the battery that is produced. However, an electronic connection must not be re-established in this process, which is to say short circuits must be avoided.

So as to join the two electrodes, it is possible to use a material-specific, novel, or already known method. In the case of ceramic materials, the joining can take place simply by way of sintering at elevated temperatures, for example. The cell thus produced can then be further processed to obtain a cell combination and the solid-state battery proper.

The assembly of the solid-state battery is carried out so that least one of the treated surfaces of the anode and/or of the cathode is present as the boundary region between the electrodes and thus assumes the function of the electrolyte. The mixed-conducting anode and the mixed-conducting cathode are thus electronically separated from each other, while ion conduction continues.

In the exemplary embodiment in which both electrodes are treated, the assembly is preferably carried out so that the two treated surfaces of the anode and of the cathode are disposed adjoining each other, and consequently are located between the electrodes. Together, the two treated surfaces assume the function of the electrolyte.

In a further embodiment of the invention, series connection of these cells thus produced may also be carried out, wherein an anode/cathode unit of a cell is brought together with the next cathode/anode unit directly, or via a current collector, until the desired number of repeated units for the stack has been reached.

A further embodiment of the invention takes into consideration that very different materials may also used for the ionic or electronic conductivity in the anode and the cathode. For example, materials having considerably different conductivities may be used for this purpose. In addition, or alternatively, it is also possible to use different active materials, wherein one material, for example, has a considerably higher capacity In these cases, a sandwich unit (or more sandwich units) comprising, for example, 2 cathodes on the outside and an anode in the center (or correspondingly vice versa), is also conceivable to produce a solid-state battery. Depending on the design, this generally results in advantages in terms of the power density or the energy density. The sandwich unit can in particular be provided as a three-pole design.

Variants in production result from the aforementioned design. It may be advantageous from a process point of view, for example, to treat two opposing surfaces of only the center electrode in accordance with the invention, and to then provide these with a respective untreated counter electrode. Or the electrodes provided for the outside are each surface-treated only on one side and subsequently joined to the untreated center electrode via this region.

The cells thus produced can also be brought together in the form of a series connection with the next sandwich-unit directly, or via current collectors, until the desired number of repeat units for the stack has been reached.

When the solid-state battery is being assembled, the anode and the cathode can optionally also be joined with the aid of further process steps or additional materials, for example so as to suppress the re-establishment of the electrical connection and/or facilitate the ion migration at the interface.

Establishing a particularly good joint can also include, for example, the use of additional materials in the mixed-conducting electrodes or additionally applying what are known as sintering auxiliary materials (or catalysts, flux, and the like) to the interface. For example, if $Li_7La_3Zr_2O_{12}$ (LLZ) is one phase of the electrode, Li salts can advantageously be used as additional materials that form a melt, or other oxides having a lower melting point, such as $Li_3BO_3$.

Moreover, this shall also be understood to include mechanical or chemical process steps, which are used to optimally join the surfaces of the anode and the cathode, such as prior roughening or prior heating of the interfaces, for example, and fixation under pressure.

The method according to the invention advantageously enables a production process for a solid-state battery in which a thin film method for a separate electrolyte, which previously was usually expensive and complicated, is replaced by a considerably simpler surface treatment method on at least one of the electrodes to produce an electrolyte.

This results, among other things, in advantages with respect to the surface tolerances to be set, with respect to the material selection and the speed of the process, which are ultimately cost advantages compared to other production processes.

The production method according to the invention can be combined as follows and comprises at least the following process steps:
  producing or providing a mixed-conducting anode and a mixed-conducting cathode;
  modifying the surface of at least one of these mixed-conducting electrodes to a certain depth with respect to the phase that causes the electronic conductivity in such a way that the electronic conductivity is considerably reduced, and more particularly to less than $10^{-8}$ S/cm; and
  thereafter, bringing the electrodes together and joining them suitably to form an electrochemical cell in such a way that at least one modified surface or one of the modified surfaces is disposed on the interface between the two electrodes and assumes the function of an electrolyte.

DESCRIPTION OF THE PREFERRED EMBODIMENTS

The invention will be described in more detail hereinafter based on suitable materials, exemplary embodiments and explanations about the process steps.

Specific application examples for materials and further characteristics for this invention are provided hereafter, among other things, based on the example of a Li-ion battery, but are not limited to this example.

a) Suitable cathode materials (active materials) for a Li-ion battery (commercially available) that may be used in the method according to the invention:

|  | Cathode material | | | |
| --- | --- | --- | --- | --- |
|  | $LiCoO_2$ | $LiMn_2O_4$ | $Li(NiCoMn)O_2$ | $LiFePO_4$ |
| Reversible capacity (mAh/g) | 140 | 100 | 150 | 145 |
| Working voltage (V) | 3.6 | 3.8 | 3.8 | 3.2 |
| Energy density of the battery (Wh/kg) | 180 | 100 | 170 | 130 |

Further possible suitable mixed-conducting cathode materials that can be used and modified according to the invention include: $LiNiO_2$, $LiMn_2O_4$ doped with Ni, Co, Fe, and $LiAPO_4$ where A=Fe, Ni, Co, Mn.

Suitable cathode materials for sodium-ion batteries include: $NaFePO_4$, $NaCoO_2$, $Na_{2/3}[Ni_{1/3}Mn_{2/3}]O_2$, $NaVPO_4F$, $Na_3V_2(PO_4)_3$.

b) Suitable anode materials (active materials) for a Li-ion battery that may be used in the method according to the invention:

| Anode material | Limiting joint | Mean voltage vs. Li*/Li (V) | Theor. spec. capacity (mAh/g) | Theor. capacity density (Ah/L) | Volume expansion upon reaching theor. capacity (%) |
| --- | --- | --- | --- | --- | --- |
| Carbon-based | $LiC_6$ | 0.1 | 374 | 760 | 12.8 |
| Tin-based | $Li_{4.4}Sn$ | 0.4 | 992 | 7240 | 260 |
| Silicon-based | $Li_{4.4}Si$ | 0.3 | 4200 | 9660 | 310 |
| $Li_4Ti_5O_{12}$ | $Li_7Ti_5O_{12}$ | 1.5 | 175 | 610 | <1 |

Li metal, for example, should also be mentioned as a further possible mixed-conducting anode material that can be used and modified according to the invention.

Suitable anode materials for sodium-ion batteries include: carbon, sodium metal, provided it is compatible with the electrolyte that is to be generated, and $Na_2Ti_6O_{13}$-related materials.

c) Suitable materials as the ion-conducting phase of the mixed-conducting anode or cathode (based on the example of a ceramic solid-state Li-ion conductor) that according to the invention form the electrolyte layer:
  phosphates: $Li_{1+x}Al_xTi_{2-x}(PO_4)_3$ (where x~0.2), Li-NASICON), $Li_{3+x}PO_{4-x}N_x$ (where x~0.2),
  LiPON glass
  oxides: $Li_{5.5}La_3Nb_{1.75}In_{0.25}O_{12}$, $Li_{6.625}La_3Zr_{1.625}Ta_{0.375}O_{12}$ (garnet structure), $Li_{3x}La_{(2/3)-x}TiO_3$ (perovskite),
  sulfates: $Li_2S$—$P_2S_5$ system, $Li_{4-x}Ge_{1-x}P_xS_4$ system (thio-LISICON).

Furthermore, materials suitable as solid electrolyte materials for sodium-ion batteries should be mentioned, such as ß- or ß'-alumina or $Na_{1+x}Zr_2Si_xP_{3-x}O_{12}$ (NASICON materials).

1. Exemplary embodiment of the production method according to the invention for a lithium-ion solid-state battery cell:
  Production of a mixed-conducting cathode comprising:
  electronically conducting phase: 35 vol % C
  ionically conducting phase: 35 vol % $Li_7La_3Zr_2O_{12}$ (LLZ)
  active material: 30 vol. % $LiFePO_4$ The capacity of the cathode having a predefined layer thickness of 60 µm is calculated from the active material (LiFePO$_4$) having a density of 3.6 g/cm$^3$ and a reversible capacity of 145 (mAh/g) at 30 vol. % as:

$$0.3 \cdot 1.45 \frac{mAh}{g} \cdot 3.6 \frac{g}{cm^3} \cdot 10\,cm^2 \cdot 60 \times 10^{-4}\,cm = 9.4\,mAh$$

Production of a mixed-conducting anode comprising:

electronically conducting phase and active material: 50 vol % C ionically conducting phase: 50 vol % Li$_7$La$_3$Zr$_2$O$_{12}$ The minimum thickness of the anode (C), which should have the same capacity as the cathode, at a density (graphite) of 2.1 g/cm$^3$ and a theoretical specific capacity of 374 (mAh/g) at 50 vol % is calculated as:

$$\frac{9.4\,mAh}{0.5 \cdot 374 \frac{mAh}{g} \cdot 2.1 \frac{g}{cm^3} \times 10\,cm^2} = 24 \times 10^{-4}\,cm = 24\,\mu m$$

This results in the following specifications for a cell thus produced:

| | | |
|---|---|---|
| cell voltage: | | 3.2 V |
| dimensions | thickness of the cathode: | 60.0 µm |
| | thickness of the anode: | 24.0 µm |
| | thickness of current conductor: 2x | 20.0 µm |
| | total thickness of cell: | 124.0 µm |
| | surface area: | 10.0 cm$^2$ |
| possible capacity: | cell | 9.4 mAh |
| | 1 mm thick battery (8 cells) | 75.2 mAh |

2. Exemplary embodiment of the production method according to the invention for a sodium-ion solid-state battery cell:

Cathode active material: NaFePO$_4$ having 154 mAh/g and approximately 2.8 V against a C-anode having 187 mAh/g and a β-Al$_2$O$_3$ solid electrolyte.

Production of a mixed-conducting cathode comprising:

electronically conducting phase: 35 vol % C ionically conducting phase: 35 vol % β-Al$_2$O$_3$ active material: 30 vol % NaFePO$_4$ The capacity of the cathode having a predefined layer thickness of 60 µm is calculated from the active material (NaFePO$_4$) having a density of 3.66 g/cm$^3$ and a reversible capacity of 154 (mAh/g) at 30 vol. % as:

$$0.3 \cdot 154 \frac{mAh}{g} \cdot 3.66 \frac{g}{cm^3} \cdot 10\,cm^2 \cdot 60 \times 10^{-4}\,cm = 10.1\,mAh$$

Production of a mixed-conducting anode comprising:

electronically conducting phase and active material: 50 vol % C ionically conducting phase: 50 vol % β-Al$_2$O$_3$ The minimum thickness of the anode (C), which should have the same capacity as the cathode, at a density (graphite) of 2.1 g/cm$^3$ and a theoretical specific capacity of 187 (mAh/g) at 50 vol % is calculated as:

$$\frac{10.1\,mAh}{0.5 \cdot 187 \frac{mAh}{g} \cdot 2.1 \frac{g}{cm^3} \cdot 10\,cm^2} = 51 \times 10^{-4}\,cm = 51\,\mu m$$

Specifications of a cell thus produced:

| | | |
|---|---|---|
| cell voltage: | | 2.8 V |
| dimensions: | thickness of the cathode: | 60.0 µm |
| | thickness of the anode: | 51.0 µm |
| | thickness of current conductor: 2x | 20.0 µm |
| | total thickness of cell: | 151.0 µm |
| | surface area: | 10.0 cm$^2$ |
| possible capacity: | cell | 10.1 mAh |
| | 1 mm thick battery (6.6 cells) | 66.7 mAh | d) Calculation of a potentially required depth to which the surface treatment according to the invention should reduce the electronic conductivity:

The depth to which the electronic conductivity must be eliminated or considerably decreased depends on various parameters. The most important is the electronic conductivity of the electrolyte itself, =produced as a result of the modification of the electrodes. Sufficiently low self-discharge must be ensured for this purpose. Desirable values for the electronic conductivity of the electrolyte or of the modified surface are <1×10$^{-8}$ S/cm, wherein a value of approximately 1×10$^{-12}$ S/cm shall be regarded as particularly advantageous.

As an exemplary calculation for the standard cell from the above 1st exemplary embodiment, a layer thickness of 500 µm results of an electrolyte for which the electronic conductivity could be reduced to 1×10$^{-9}$ S/cm for a lithium-ion battery of 3.2 V, with a surface area of 10 cm$^2$ and a maximum self-discharge current of 0.6 µA. If the electronic conductivity of the electrolyte can even be reduced to approximately 1×10$^{-12}$ S/cm, this will result in an accordingly smaller required layer thickness of approximately 0.5 µm.

The figure of the self-discharge current was estimated here at 0.6 µA, since 5% of the maximum capacity per month is a typical value for self-discharge in good lithium polymer (rechargeable batteries for MP3 players, cameras and the like).

For the above-mentioned 1st exemplary embodiment of a lithium-ion solid-state battery cell, the self-discharge current that would result is:

$$5\%\text{ of }9.4\,mAh\text{ per cell:}\quad 0.05 \cdot 9.40\,mAh = 0.47\,mAh$$

$$\text{per month}(720\,h) \rightarrow \frac{0.47 \times 10^{-3}\,Ah}{720\,h} = 0.65 \times 10^{-6}\,A = 0.65\,\mu A$$

If the treated surface region could be reduced to an electronic conductivity of 1×10$^{-9}$ S/cm, the required layer thickness of the electrolyte to be produced would be:

$$d = \frac{AU}{I}\sigma = \frac{10\,cm^2 \cdot 3.2\,V}{0.65 \times 10^{-6}\,A} \cdot 1 \times 10^{-9}\frac{A}{Vcm} = 0.05\,cm = 500\,\mu m$$

If the surface region to be treated could ultimately be reduced as far as an electronic conductivity of only 1×10$^{-12}$ S/cm, the required layer thickness of the electrolyte to be produced would be decreased to;

$$d = \frac{AU}{I}\sigma = \frac{10\,\text{cm}^2 \cdot 3.2\,V}{0.65 \times 10^{-6}A} \cdot 1 \times 10^{-12} \frac{A}{Vcm} = 0.5 \times 10^{-4}\,\text{cm} = 0.5\,\mu m$$

Furthermore, it is also useful to select the required depth of the surface treatment in relation to the particle size and phase distribution of the mixed-conducting electrodes. The particle sizes of suitable common ceramic powders generally range between 1 nm and 1 mm. The subrange from 100 nm to 100 µm is useful, or more relevant, for the majority of conventional applications. An optimal range would be around a 1 µm particle size; however, this may vary depending on the specific requirements of an application.

For the aforementioned exemplary embodiment having an electronic conductivity of the LLZ phase (ionically conducting phase) of approximately $1 \times 10^{-11}$ S/cm at room temperature and a desired leakage current (self-discharge current) of 0.65 µA, the resulting required layer thickness for the surface region to be modified is approximately 5 µm. In the event that the surfaces of both electrodes are to be treated in the same manner by way of a surface treatment, the electronically conductive phase of each electrode should be eliminated to a respective depth of 2.5 µm, for example, or reduced to the corresponding predefined value. This is a realistic value considering the desired particle size of approximately 1 µm of the LLZ matrix.

e) Suitable surface treatment methods according to the invention:

A specific treatment method that should be mentioned and could bring about the modification according to the invention of the mixed-conducting electrode surface is thermal treatment, in which carbon, as the electrically conductive phase, can be burned by heating to temperatures above 600° C. in an oxygen-containing atmosphere, for example. The of the surface can take place, for example, in a conventional furnace or a halogen furnace at a high heating rate, with air or oxygen blown into the furnace, or else by way of laser irradiation in air, and generally causes the carbon to burn out in the surface region, wherein the application time notably determines the depth of the removal.

So as to ensure that not all sides of the electrodes are subjected to the thermal treatment during the heating in the furnace, the sides not intended to be treated can be protected as follows, for example:

1) heating in protective powder (such as ceramic or carbon or the like), which is to say the sample is embedded so that only the side intended to be treated is exposed.
2) wrapping the electrode in a thin foil (such as gold, platinum, another metal having a high melting point), which is to say the sample is placed with the side to be protected on the foil and the foil is folded up on the sides, without covering the side that is to be treated.

The technology of these burn-off processes has already been studied in detail and burn-off rates have already been examined for a variety of carbon modifications, for example in the production of cavities in cast metal bodies (DE 19832718 A1) or for the resistance of carbon fiber composite materials (Untersuchungen zur Oxidationsbeständigkeit von Graphitfolien für Wärmespeicher Thomas Bauer (Analyses regarding the oxidation resistance of graphite foils for heat accumulators), Thomas Bauer, Deutsches Zentrurn für Luft-Lind Raumfahrt e.V. (DLR, German Aerospace Center), Institute of Engineering Thermodynamics, Thermophysics Working Group, Meeting, Karlsruhe, Germany, Mar. 4-5, 2010.

The electrolyte material (ionically conducting phase) $Li_7La_3Zr_2O_{12}$ (LLZ), in contrast, does not start to decompose until >1250° C. and is consequently not affected.

In addition, the temperature could be increased even further, for example up to 800° C. At this temperature, the active material $LiFePO_4$ (LFP) in the cathode could also decompose, and thereby potential short circuits could also be prevented by the active material.

Another possible alternative to the aforementioned method is dissolving the carbon out by way of a highly oxidizing acid, such as by way of sulfuric acid (optionally hot sulfuric acid) or nitric acid. The end product when nitric acid is used would be mellitic acid ($C_6(CO_2H)_6$), for example, which can further be used as a catalyst $V_2O_5$ to increase the reaction.

Moreover, electrochemical oxidation of the carbon is also possible, for example with the aid of hydroxide melts (LiOH, KOH or NaOH) and the application of a voltage, as it is known from alkaline fuel cells (AFC) or direct carbon fuel cells (DCFC). Once again, the current intensity and application time determine the layer depth of the oxidation (operating temperature around 700° C., graphite in the mixed electrodes acts as the anode and "fuel," typical current densities around 100 mA/cm$^2$ at 0.45 V).

Should the two previous methods not be compatible with the electrolyte material that is used, for example because the electrode comprises a material different from $Li_7La_3Zr_2O_{12}$ (LLZ), such as a phosphate which already decomposes at T>800° C., the carbon can also be removed more gently by way of ozone cleaning, for example. Such a method is carried out in a similar form with Si wafer cleaning in industry. Since carbon is frequently used as the electric phase even in mixed-conducting anodes, the same method can advantageously also be used for treating an anode.

Suitable measures must be taken with all of the above-mentioned measures, notably also when heating in a furnace, to ensure that only the surface that is to be modified is indeed modified in the corresponding manner by the treatment.

For example, when heating in the furnace, the electrode can be protected on the surfaces that are not to be modified by providing these surfaces with a protective layer, for example an additional graphite layer. In the case of a treatment with a liquid reagent, the electrode can be immersed in the liquid only at the surface to be modified, for example, or the surface to be modified can be wetted only superficially with the liquid.

The following tables provide further mixed-conducting anodes and cathodes in combination with respective suitable surface treatment methods by way of example within the meaning of the invention.

| Anode | "Electrolyte" to be produced | Conducting additive (electrical) | Treatment method |
| --- | --- | --- | --- |
| $Li_{4.4}Sn$ | $Li_{1+x}Al_xTi_{2-x}(PO_4)_3$ | Sn (=anode) | $O_3$ plasma or HCl solution |
| Li metal | LiPON | Li metal (=anode) | oxiding in air or oxygen or nitriding in $N_2$ |
| $Li_{4.4}SI$ | $Li_7La_3Zr_2O_{12}$ | B (doped Si) | oxidizing at 800° C. in air (furnace) |
| Na metal | β $Al_2O_3$ | Na (=anode) | $Cl_2$ gas –> NaCl formation |
| $Na_2Ti_6O_{13}$ | $Na_{1+x}Zr_2Si_xP_{3x}O_{12}$ | C | heating in oxygen/air or oxidizing acid |

-continued

| Cathode | "Electrolyte" to be produced | Conducting additive (electrical) | Treatment method |
|---|---|---|---|
| $LiMn_2O_4$ | $Li_{1+x}Al_xTi_{2-x}(PO_4)_3$ | C | $O_3$ plasma or oxidizing acid |
| $LiCoO_2$ | LiPON | Co | oxidizing in air or oxygen or HCl acid |
| $Li(NiCoMn)O_2$ | $Li_7La_3Zr_2O_{12}$ | Ni | oxidizing in air or oxygen or HCl acid |
| $NaCoO_2$ | $\beta\ Al_2O_3$ | Co | oxidizing in air or oxygen or HCl acid |
| $Na_{2/3}[Ni_{1/3}Mn_{2/3}]O_2$ | $Na_{1+x}Zr_2Si_xP_{3-x}O_{12}$ | C | heating in oxygen/air or oxidizing acid | f) Treatment of anode and/or cathode:

The decision as to whether the anode and cathode surfaces that are to be joined for the solid-state battery require additional treatment and which decision produces optimal results depends, among other things, on the electronically conducting phases of the anode and the cathode and the compatibility of the electrode material and the treatment method.

If the two mixed-conducting electrodes comprise the same phase that causes the electronic conductivity, it is possible in some circumstances to employ the same method for reducing the electronic conductivity on the surfaces of both the cathode and the anode. On a large scale, this could be advantageous in terms of process speed. For example, the treatment of double the surface area to a defined depth could be more advantageous than the treatment of only a single surface area to twice the depth.

If the other phases, which is to say the active material and the ion-conductive phase, of the two electrodes are compatible with the selected surface method, advantageously identical methods can be employed for both electrodes. Otherwise optionally two different surface treatment methods must be selected to achieve the above-mentioned advantage of process speed, which could then potentially result in higher investment costs.

If the anode and cathode to be used comprise two different materials for the electronic conductivity, or if one of these phases has two properties that cannot be influenced independently of one another, it might be prudent to treat only one of the mixed-conducting electrodes.

g) Suitable methods for joining the anode and the cathode on the treated surface(s):

In a specific exemplary embodiment of the invention, $Li_7La_3Zr_2O_{12}$ (LLZ) matrices, which may occur after the modification according to the invention of a surfaces of mixed-conducting anode and cathode, were placed on top of each other by way of example and sintered in air without pressure at 1200° C. for 35 hours. An equally sized sample made of LLZ matrix served as the comparison sample. The conductivity of the sample through the interface was examined, as were changes in the sample resulting from contact. The result that was found was that the overall conductivity was only reduced from $8.8 \times 10^{-5}$ S/cm by a factor of 1.5 to $5.8 \times 10^{-5}$ S/cm compared to the continuous comparison sample having the same size.

FIGS. 1 to 4 show different embodiments of possibilities for joining the two electrodes to obtain an electrochemical cell. In the figures, E=mixed-conducting electrodes (anode or cathode) and E'=corresponding mixed-conducting counter electrode (cathode or anode), $E_m$ characterizes the modified surface region of the electrode E, and $E'_m$ the modified surface region of the counter electrode E'. CC identifies current collectors.

Figure 1:
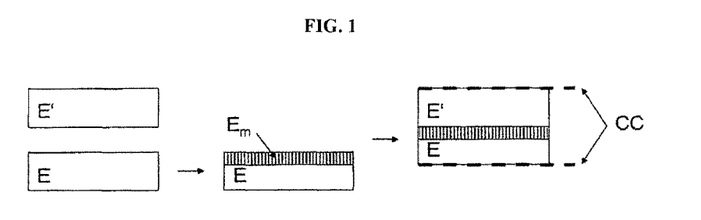
FIG. 1 is a schematic illustration of a production route for an electrochemical cell.
Figure 2:
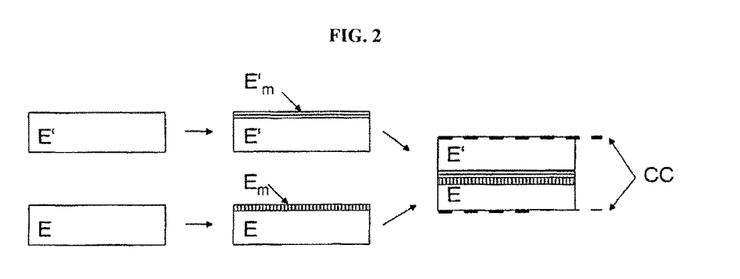
FIG. 2 is a schematic illustration of an alternative production route for an electrochemical cell.

FIGS. 1 and 2 are schematic illustrations of alternative production routes for an electrochemical cell, depending on whether only one mixed-conducting electrode surface is modified, or both that of the anode and that of the cathode are modified.

Figure 3:
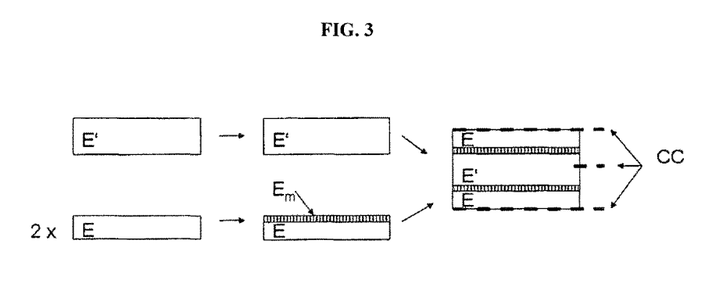
FIG. 3 shows an embodiment of possibilities for joining the two electrodes to obtain an electrochemical cell.
Figure 4:
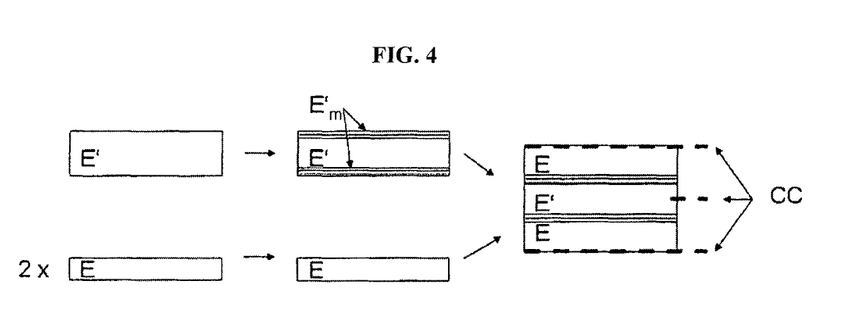
FIG. 4 shows an different embodiment of possibilities for joining the two electrodes to obtain an electrochemical cell.

FIGS. 3 and 4 show possible modifications or arrangement variants in the form of a sandwich unit, which advantageously yield higher voltages or current densities, and consequently higher energy densities or power densities, for certain material systems.

h) Identifying features of a cell produced by way of this claim;

The surface treatment ideally does not alter the ion-conducting phase, whereby the structure on what will later be the joining site is also maintained. If this is also not altered during the final joining of the mixed-conducting anode and cathode, this region may be easily identified using suitable microscopy methods. The different contrast of the modified phase, or the complete absence of the electrically conductive phase in the otherwise unmodified matrix of the ionically conducting phase can be taken advantage of for this purpose.

The invention claimed is:

1. A method for producing at least one electrochemical cell of a solid-state secondary, rechargeable lithium ion battery, comprising the following steps:
producing or providing a mixed-conducting anode which is ion conducting and which comprises carbon;
producing or providing a mixed-conducting cathode which is ion conducting and which comprises carbon;
treating at least one of the mixed conducting-anode and the mixed-conducting cathode so as to remove the carbon in a layer extending from the surface to a predetermined depth, each of the at least one layer from which the carbon has been removed having an electronic conductivity which is reduced relative to an electronic conductivity of the layer before the treating, electronic conductivity perpendicular to the electrochemical cell of each of the at least one layer of reduced electronic conductivity being less than $10^{-8}$ S/cm at room temperature and ionic conductivity at room temperature of each of the at least one layer of reduced electronic conductivity being at least $10^{-6}$ S/cm, wherein the treating comprises burning the carbon, dissolving the carbon with a highly oxidizing acid, electrochemically oxidizing the carbon, or removing the carbon by ozone cleaning; and
subsequently assembling the mixed-conducting anode and the mixed-conducting cathode to form a solid-state battery in such a way that the layer of reduced electronic conductivity of at least one of the mixed-conducting anode and the mixed-conducting cathode is disposed on a boundary between the mixed-conducting anode and the mixed-conducting cathode, and the mixed-conducting anode and the mixed-conducting cathode are thereby electronically separated, wherein the mixed-conducting anode and the mixed-conducting cathode comprise a first electrode and a second electrode and once the solid-state battery is assembled, then 1) the two electrodes are in contact with a same of the at least one layer of reduced electronic conductivity or 2) the first electrode is in contact with a first of the at least one layer of reduced electronic conductivity and the second electrode is in contact with a second of the at least one layer of reduced electronic conductivity, and the first and second of the at least one layer of reduced electronic conductivity are in contact with each other, and an electrolyte of the solid-state battery consists of an ion conducting solid electrolyte consisting of the at least one layer of reduced electronic conductivity, wherein the mixed-conducting anode and the mixed-conducting cathode each further comprises at least one compound selected from the group consisting of: $Li_{1+x}Al_xTi_{2-x}(PO_4)_3$ (where x is 0.2); Li-NASICON; $Li_{3+x}PO_{4-x}N_x$ (where x is 0.2); LiPON glass; $Li_{5.5}La_3Nb_{1.75}In_{0.25}O_{12}$; $Li_{6.625}La_3Zr_{1.625}Ta_{0.375}O_{12}$; $Li_{3x}La_{(2/3)-x}TiO_3$; $Li_2S-P_2S_5$; $Li_{4-x}Ge_{1-x}P_xS_4$; β-alumina; β'-alumina; and $Na_{1+x}Zr_2Si_xP_{3x}O_{12}$ (where 0<x<3).

2. The method according to claim 1, wherein the treating is of both of the mixed-conducting anode and the mixed-conducting cathode.

3. The method according to claim 1, wherein the sum of the layer thickness of the at least one layer of reduced electronic conductivity when assembled is a layer thickness of at least 0.1 nm and no more than 100 μm.

4. The method according to claim 1, wherein the treating of at least one of the mixed-conducting anode and the mixed-conducting cathode reduces the electronic conductivity at room temperature of the at least one layer of reduced electronic conductivity to less than $10^{-10}$ S/cm at room temperature.

5. The method according to claim 1, wherein when the mixed-conducting anode and the mixed-conducting cathode are assembled with the at least one layer of reduced electronic conductivity of at least one of the mixed-conducting anode and the mixed-conducting cathode, an additional substance is introduced at an interface between the two electrodes.

6. The method according to claim 1, wherein the ionic conductivity at room temperature of the at least one layer of reduced electronic conductivity is more than $10^{-4}$ S/cm.

7. The method according to claim 3, wherein the sum of the layer thickness of the at least one layer of reduced electronic conductivity when assembled is a layer thickness between 0.1 μm and 10 μm.

8. The method according to claim 4, wherein the electronic conductivity of the at least one layer of reduced electronic conductivity is less than $10^{-12}$ S/cm at room temperature.

9. The method according to claim 6, wherein the ionic conductivity at room temperature of the at least one layer of reduced electronic conductivity is more than 10'S/cm.

10. The method according to claim 1, wherein a length of the at least one layer of reduced electronic conductivity is a same length as at least one of the mixed conductivity anode and the mixed-conducting cathode.

11. The method according to claim 1, wherein the layer of reduced electronic conductivity is present only between the mixed-conducting anode and the mixed-conducting cathode.

* * * * *